United States Patent
Nakashima (10) Patent No.: US 9,527,434 B2
(45) Date of Patent: Dec. 27, 2016

(54) VEHICULAR LIGHTING APPARATUS

(71) Applicant: TOYOTA JIDOSHA KABUSHIKI KAISHA, Toyota-shi, Aichi-ken (JP)

(72) Inventor: Kazuhiko Nakashima, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/722,978

(22) Filed: May 27, 2015

(65) Prior Publication Data

US 2016/0009218 A1 Jan. 14, 2016

(30) Foreign Application Priority Data

Jul. 9, 2014 (JP) ................. 2014-141453

(51) Int. Cl.
| | |
|---|---|
| *G06F 7/00* | (2006.01) |
| *B60Q 1/14* | (2006.01) |
| *B60Q 1/08* | (2006.01) |
| *B60Q 1/04* | (2006.01) |
| *B60Q 1/20* | (2006.01) |

(52) U.S. Cl.
CPC .......... *B60Q 1/143* (2013.01); *B60Q 1/04* (2013.01); *B60Q 1/085* (2013.01); *B60Q 1/20* (2013.01); *B60Q 2300/054* (2013.01); *B60Q 2300/312* (2013.01); *B60Q 2300/322* (2013.01); *B60Q 2300/33* (2013.01); *B60Q 2400/50* (2013.01)

(58) Field of Classification Search
CPC ....... B60Q 1/143; B60Q 1/04; B60Q 2300/54; B60Q 2300/312; B60Q 2300/33; B60Q 1/085; B60Q 1/20; B60Q 2300/322; B60Q 2400/50
USPC .......... 701/36; 362/545, 37; 356/51
See application file for complete search history.

(56) References Cited

U.S. PATENT DOCUMENTS

| | | | |
|---|---|---|---|
| 7,021,791 B1* | 4/2006 | Kobayashi | B60Q 1/085 362/212 |
| 2004/0085201 A1* | 5/2004 | Dubrovin | B60Q 1/085 340/458 |
| 2005/0036325 A1* | 2/2005 | Furusawa | B60Q 1/06 362/460 |

(Continued)

FOREIGN PATENT DOCUMENTS

| | | |
|---|---|---|
| DE | 102012003158 A1 | 8/2013 |
| EP | 2374660 A2 | 10/2011 |

(Continued)

*Primary Examiner* — Shardul Patel
(74) *Attorney, Agent, or Firm* — Oliff PLC (57) ABSTRACT

A vehicular lighting apparatus includes a headlight that irradiates the front of a vehicle; a condition detection part that detects a weather condition at a position of the vehicle; a travelling route estimation part that estimates a road shape of a travelling route in front of the vehicle; and a control part that controls a luminous intensity distribution of the headlight. The control part controls the headlight in such a manner as to irradiate a road surface zone in front of the vehicle with a reduced quantity of light when the condition detection part detects such a weather condition as to cause a low visibility in front of the vehicle, the road surface zone in front of the vehicle corresponding to the road shape of the travelling route estimated by the travelling route estimation part.

10 Claims, 4 Drawing Sheets

(56) References Cited

U.S. PATENT DOCUMENTS

| | | | | |
|---|---|---|---|---|
| 2007/0024200 A1* | 2/2007 | Morishita | ............... | B60Q 1/122 |
| | | | | 315/82 |
| 2007/0103923 A1* | 5/2007 | Fukawa | ............... | F21S 48/1154 |
| | | | | 362/545 |
| 2007/0299606 A1* | 12/2007 | Fujimoto | .................. | B60T 7/22 |
| | | | | 701/450 |
| 2008/0225271 A1* | 9/2008 | Ohmura | ................. | B60Q 1/085 |
| | | | | 356/51 |
| 2009/0190324 A1* | 7/2009 | Watanabe | .............. | B60Q 1/085 |
| | | | | 362/40 |
| 2009/0315479 A1* | 12/2009 | Hayakawa | ............. | B60Q 1/143 |
| | | | | 315/294 |
| 2011/0116277 A1* | 5/2011 | Niemz | ................... | B60Q 1/085 |
| | | | | 362/464 |
| 2012/0242832 A1* | 9/2012 | Datta | ..................... | B60Q 1/143 |
| | | | | 348/148 |
| 2014/0139670 A1* | 5/2014 | Kesavan | ............ | G06K 9/00791 |
| | | | | 348/148 |
| 2016/0023591 A1* | 1/2016 | Imaeda | ................ | B60Q 1/1423 |
| | | | | 315/82 |

FOREIGN PATENT DOCUMENTS

| | | |
|---|---|---|
| EP | 2399777 A2 | 12/2011 |
| JP | 2007-182151 A | 7/2007 |
| JP | 2010-095048 A | 4/2010 |
| JP | 2012-006482 A | 1/2012 |
| JP | 2012-051488 A | 3/2012 |

* cited by examiner

VEHICULAR LIGHTING APPARATUS

BACKGROUND OF THE INVENTION

1. Field of the Invention

The present invention relates to a vehicular lighting apparatus that irradiates the front of a vehicle.

2. Description of the Related Art

In the related art, a vehicular headlight apparatus is known which irradiates a travelling route in front of the vehicle in such a manner as to display an irradiation shape that indicates a road shape in front of the vehicle in the irradiation range of the headlight (for example, see Japanese Laid-Open Patent Application No. 2007-182151). Thereby, it is possible to improve the visibility of the travelling route in front of the vehicle in night travelling or so.

SUMMARY OF THE INVENTION

According to an aspect of the present invention, a vehicular lighting apparatus includes a headlight that irradiates the front of a vehicle; a condition detection part that detects a weather condition at a position of the vehicle; a travelling route estimation part that estimates a road shape of a travelling route in front of the vehicle; and a control part that controls a luminous intensity distribution of the headlight. The control part controls the headlight in such a manner as to irradiate a road surface zone in front of the vehicle with a reduced quantity of light when the condition detection part detects such a weather condition as to cause a low visibility in front of the vehicle, the road surface zone in front of the vehicle corresponding to the road shape of the travelling route estimated by the travelling route estimation part.

Other objects, features and advantages of the present invention will become more apparent from the following detailed description when read in conjunction with the accompanying drawings.

DETAILED DESCRIPTION OF THE EMBODIMENTS

In the above-described related art, in a bad weather condition such as a rainfall, a snowfall, fog generation or so causing a low visibility in front of a vehicle, the visibility in the irradiation shape indicating the road shape displayed on the travelling route in front of the vehicle is low. Thus, it may be impossible to appropriately improve the visibility of the travelling route in front of the vehicle.

For example, during rainfall, the light irradiated by the headlight may be totally reflected by the wet road surface. Therefore, it may be impossible to see the irradiation shape indicating the road shape displayed on the road surface. During snowfall, the road surface is white due to the snow, and it may be difficult to see a shadow. As a result, it may be difficult to see the displayed irradiation shape indicating the road shape. During fog generation, due to a veiling effect occurring as a result of the irradiation light in front of the vehicle being irregularly reflected by fog particles, a whiteout state may occur where the driver's view is filled with solid white, and it may be difficult for the driver to see the road surface itself in front of the vehicle.

In consideration of the problem, an object of the embodiment of the present invention is to provide a vehicle lighting apparatus by which it is possible to improve the visibility of the travelling route in front of a vehicle even in a bad weather condition such as rainfall, snowfall, fog generation or so causing a low visibility in front of the vehicle.

Below, the embodiment of the present invention will be described using the drawings.

Figure 1:
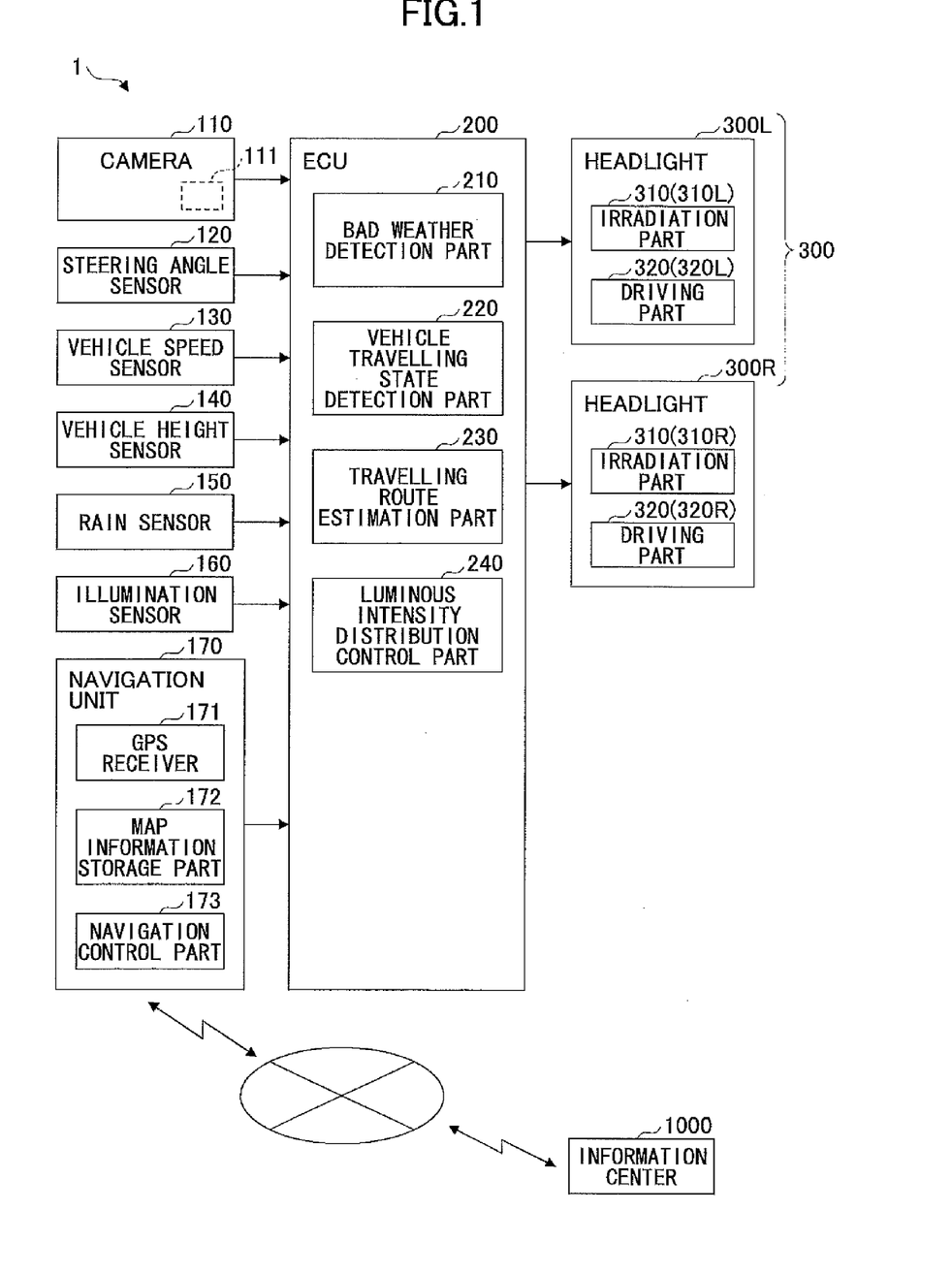
FIG. 1 is a block diagram illustrating one example of a configuration of a vehicular lighting apparatus according to a first embodiment.

FIG. 1 is a block diagram illustrating one example of a configuration of the vehicular lighting apparatus 1 according to the first embodiment. The vehicular lighting apparatus 1 is an onboard apparatus capable of irradiating the front of a vehicle while appropriately changing the luminous intensity distribution, as will be described. Below, a "vehicle" means a vehicle in which the vehicular lighting apparatus 1 is installed.

The vehicular lighting apparatus 1 includes a camera 110, a steering angle sensor 120, a vehicle speed sensor 130, a vehicle height sensor 140, a rain sensor 150, an illumination sensor 160, a navigation unit 170, an Electronic Control Unit (ECU) 200, a headlight 300 and so forth.

The camera 110 is a device for photographing the front of the vehicle, and, for example, is a stereo camera capable of detecting the position of an object in front of the vehicle from a photographed image. The camera 110 is installed in the vehicle at such a position as to be able to photograph the front of the vehicle, and, for example, can be placed in the vehicle interior at a top part of the front window, from the viewpoint of being dustproof and waterproof. The camera 110 includes an image processing part 111. Note that, unless the operation is stopped, the camera 110 continuously photographs 30 frames of images per second, for example, and transmits the images to the image processing part 111 each time photographing the image.

The image processing part 111 carries out predetermined image processing based on images in front of the vehicle photographed by the camera 110 (hereinafter, simply referred to as "photographed images"). For example, it is possible that the image processing part 111 includes a microcomputer and so forth and carries out the predetermined image processing as a result of a CPU executing various programs stored in a ROM. Specifically, the image processing part 111 carries out image processing for detecting the road shape in front of the vehicle (the road width, the curvature of a curved road, the shape of a branch road such as an intersection, or so). For example, the image processing part 111 detects the brightness at each portion (pixel) while scanning a photographed image, and detects a white line on the road surface or so based on the detected brightness using a known method. Then, it is possible that, based on the shape of the detected white line, the distance between the white lines and so forth, the image processing part 111 detects the road shape in front of the vehicle (the road width, the curvature of a curved road, the shape of a branch road such as an intersection, or so).

Further, the image processing part 111 carries out image processing for detecting a weather condition at the position of the vehicle (around the vehicle), in particular, a bad whether condition such as a rainfall, a snowfall, fog generation or so causing a low visibility in front of the vehicle. More specifically, the image processing part 111 detects the brightness of each portion (pixel) while scanning a photographed image and detects a bad weather condition such as a rainfall, a snowfall, fog generation or so based on the detected brightness using a known method. For example, it is possible that, when detecting high brightness over a lower zone of a photographed image (a zone where the road surface in front of the vehicle is photographed), the image processing part determines that the brightness points are generated as a result of the irradiation light from the headlight 300 being reflected by the wet road surface or snow on the road, and detects a rainfall or a snowfall depending on the brightness levels. If very small high bridgeless points are detected over an upper zone or the entire zone of a photographed image, it is possible that the image processing part 111 determines that the brightness points are generated as a result of the irradiation light from the headlight 300 being reflected by falling snow, and detects a snowfall. If a belt-like line corresponding to the optical axis from the headlight 300 (detectable based on the brightness of each portion of a photographed image and the brightness change rate along the scanning direction) are detected in the photographed images, it is possible that the image processing part 111 detects fog generation.

The image processing part 111 (the camera 110) is connected with the ECU 200 in a mutually communicatable manner through an onboard Local Area Network (LAN) or so, and outputs information concerning the detected road shape in front of the vehicle ("road shape information"), information concerning a bad weather condition ("bad weather information") and so forth to the ECU 200.

Note that some or all of the functions of the image processing part 111 can be implemented by a processing unit outside the camera 110, and, for example, can be implemented by the ECU 200.

The steering angle sensor 120 is a known detecting device for detecting a steering angle of steering performed by the driver. The steering angle sensor 120 is connected with the ECU 200 through the onboard LAN or so in a mutually communicable manner and a signal corresponding to the detected steering angle (a "steering angle signal") is transmitted to the ECU 200.

The vehicle speed sensor 130 is a known detecting device for detecting the vehicle speed of the vehicle. The vehicle speed sensor 130 is connected with the ECU 200 through the onboard LAN or so in a mutually communicable manner and a signal corresponding to the detected vehicle speed (a "vehicle speed signal") is transmitted to the ECU 200.

The vehicle height sensor 140 is a known detecting device for detecting a change amount of the vehicle height, i.e., for measuring the moving amount of the vehicle in the height directions (upward/downward directions), and includes a front vehicle height sensor detecting the moving amount in the height directions of a front part of the vehicle and a rear vehicle height sensor detecting the moving amount in the height directions of a rear part of the vehicle. It is possible that the front vehicle height sensor and the rear vehicle height sensor detect the upward/downward moving amounts of the front and rear suspensions with respect to prescribed positions, for example. The vehicle height sensor 140 (including the front vehicle height sensor and the rear vehicle height sensor) is connected with the ECU 200 through the onboard LAN or so in a mutually communicable manner and a signal corresponding to the detected upward/downward moving amounts (a "vehicle height signal") is transmitted to the ECU 200.

The rain sensor 150 is a known detecting device for detecting a rainfall. Specifically, it is possible that the rain sensor 150 detects raindrops present on the front window and the amount thereof. The rain sensor 150 is connected with the ECU 200 through the onboard LAN or so in a mutually communicable manner and a signal corresponding to the detected rainfall (a "rain signal") is transmitted to the ECU 200.

The illumination sensor 160 is a known detecting device for detecting the darkness (or illumination) around the vehicle. Specifically, the illumination sensor 160 is capable of detecting the illumination around the vehicle by detecting the illumination of light incident into the vehicle interior from the outside (as a substitution for the illumination around the vehicle). Therefore, the illumination sensor 160 can be placed on a top part of an instrument panel in the vehicle interior at such a position that light incident from the front window is incident thereon, for example. The illumination sensor 160 is connected with the ECU 200 through the onboard LAN or so in a mutually communicable manner and a signal corresponding to the detected illumination (an "illumination signal") is transmitted to the ECU 200.

The navigation unit 170 is a route guiding device carrying out route guidance for a destination based on the position of the vehicle, map information, traffic information received through a communication device and/or the like. The navigation unit 170 includes a GPS receiver 171 receiving GPS signals from Global Positioning System (GPS) satellites, a map information storage part 172 storing the map information including road information (including road widths, curvatures of roads, and so forth), and a navigation control part 173 carrying out various control processes in the navigation unit 170. The navigation unit 170 is connected with an information center 1000 that delivers various sorts of information such as the traffic information (probe information, VICS (registered trademark), and so forth), weather information, road updated information and so forth to the vehicle through a communication network such as a cell phone network. Further, the navigation unit 170 is connected with the ECU 200 through the onboard LAN or so in a mutually communicable manner.

The navigation control part 173 is capable of detecting the position (for example, the longitude and the latitude) of the vehicle from the GPS signals received by the GPS receiver 171, and transmits information concerning the detected position of the vehicle ("vehicle position information") to the ECU 200. Also, the navigation control part 173 reads the map information (including the road information) corresponding to the position of the vehicle from the map information storage part 172, and transmits it to the ECU 200. Further, the navigation control part 173 transmits information concerning a guidance route ("guidance route information") to the ECU 200. Also, the navigation control part 173 transmits weather forecast information received from the information center 1000 (for example, information concerning the weather at the place where the vehicle will pass a predetermined period of time later, and so forth) to the ECU 200. Also, the navigation control part 173 updates the map information stored by the map information storage part 172 by using the road updated information delivered by the information center 1000 (for example, information of roads newly installed, repaired roads, and/or the like).

The ECU 200 is a control device for carrying out luminous intensity distribution control of the headlight 300, and it is possible that the ECU 200 includes a microcomputer or so, and carries out various control processes as a result of a CPU executing various programs stored by a ROM. The ECU 200 implements a bad weather detection part 210, a vehicle travelling state detection part 220, a vehicle travelling route estimation part 230, a luminous intensity distribution control part 240, and so forth, as functional blocks as a result of the CPU executing a corresponding program(s).

The bad weather detection part 210 detects a bad weather condition (a weather condition of a rainfall, a snowfall, fog generation, or so, causing a low visibility in front of the vehicle) at the current position of the vehicle based on the signals and/or information transmitted from the camera 110 (the image processing part 111), the rain sensor 150, the illumination sensor 160, the navigation unit 170 (the navigation control part 173) and/or the like. For example, it is possible that the bad weather detection part 210 detects a bad weather condition at the current position of the vehicle based on the bad weather information transmitted by the image processing part 111. It is also possible that the bad weather detection part 210 detects a bad weather condition at the current position of the vehicle in consideration of the weather forecast information transmitted by the navigation control part 173 in addition to the bad weather information transmitted by the image processing part 111. When detecting a rainfall, it is possible that the bad weather detection part 210 detects a rainfall in consideration of the rain signal transmitted by the rain sensor 150 in addition to the bad weather information and the weather forecast information transmitted by the image processing part 111 and the navigation control part 173. It is also possible that the bad weather detection part 210 detects the bad weather condition after determining whether it is a day or a night, based on the illumination signal from the illumination sensor 160. The bad weather detection part 210 outputs the detection result to the luminous intensity distribution control part 240.

The vehicle travelling state detection part 220 detects a travelling state of the vehicle (the vehicle speed, the steering angle, the posture of the vehicle in the pitch direction and/or the like) based on the steering angle signal, the vehicle speed signal and the vehicle height signal transmitted by the steering angle sensor 120, the vehicle speed sensor 130 and the vehicle height sensor 140. The vehicle travelling state detection part 220 outputs the detection result to the vehicle travelling route estimation part 230 and the luminous intensity distribution control part 240.

Note that, as described above, the vehicle height signal transmitted by the vehicle height sensor 140 includes the vehicle height signals from the vehicle rear part and the vehicle front part. Therefore, it is possible to detect (calculate) the posture of the vehicle in the pitch direction from the moving amount from the prescribed vehicle height at the front part and the moving amount from the prescribed vehicle height at the rear part.

The vehicle travelling route estimation part 230 estimates the road shape (the road width, the curvature of a curved road, the shape of a branch road such as an intersection, or so) of the travelling route in front of the vehicle (the road in front of the vehicle where the vehicle is travelling) based on information transmitted by the camera 110 (the image processing part 111) and the navigation unit 170 (the navigation control part 173) and/or the like. Specifically, The vehicle travelling route estimation part 230 estimates, as the road shape of the travelling route in front of the vehicle, the road shape of the travelling route in front of the vehicle's current position and the road shape of the travelling route in front of the vehicle's future position (the position after a predetermined period of time T). For example, it is possible that the vehicle travelling route estimation part 230 estimates the road shape of the travelling route based on the vehicle position information and the map information (including the road information) transmitted by the navigation control part 173. It is also possible that the vehicle travelling route estimation part 230 estimates the road shape of the travelling route in consideration of the road shape information transmitted by the image processing part 111 in addition to the vehicle position information and the map information (including the road information) transmitted by the navigation control part 173. Further, it is possible that the vehicle travelling route estimation part 230 estimates the travelling route in a case where there are a plurality of alternatives such as those in a branch road, an intersection or so, based on the guidance route information transmitted by the navigation control part 173. When route guidance by the navigation unit 170 is not being carried out, it is possible that the vehicle travelling route estimation part 230 estimates the road shapes of all the travelling routes as the alternatives, or it is also possible that the vehicle travelling route estimation part 230 estimates the road shape of a travelling route by determining the travelling route (to turn right, turn left, go straight or so) based on a signal from the vehicle's traffic indicator (the blinker switch). The vehicle travelling route estimation part 230 outputs the estimated road shapes of the travelling routes (including the respective road shapes corresponding to the vehicle's current and the future positions) to the luminous intensity distribution control part 240.

Note that the vehicle travelling route estimation part 230 calculates the vehicle's future position based on the vehicle's current position based on the vehicle position information transmitted by the navigation control part 173 in consideration of the vehicle's moving amount estimated from the vehicle speed, the steering angle and so forth received from the vehicle travelling state detection part 220. The road shape estimated by the vehicle travelling route estimation part 230 is the road shape in front of the vehicle within a predetermined range from the vehicle's position (the current position or the future position) (for example, within a range assumed as the irradiation range of the headlight 300) in front of the vehicle. Also, as described above, the map information stored in the map information storage part 172 is updated by the road updated information delivered by the information center 1000. Therefore, the road shape of the travelling route is estimated based on the latest map information.

The luminous intensity distribution control part 240 carries out the luminous intensity distribution control of the headlight 300 specifically based on the detection results and the estimation results that are input by the bad weather detection part 210, the vehicle travelling state detection part 220 and the vehicle travelling route estimation part 230. As will be described later, the headlight 300 is a lighting device capable of drawing an image on a desired projection plane in front of the vehicle. The luminous intensity distribution control part 240 carries out the luminous intensity distribution control of the headlight 300 for the purpose of improving the visibility of the travelling route in such a bad weather condition as to cause a low visibility in front of the vehicle. Details of the luminous intensity distribution control by the luminous intensity distribution control part 240 in a bad weather condition will be described later.

The headlight 300 is the lighting device for irradiating the front of the vehicle and includes a headlight 300L installed at a left side of a front part of the vehicle and a headlight 300R installed at a right side of the front part of the vehicle. It is possible that the headlight 300 has an automatic leveling function of automatically adjusting the optical axis in the upward/downward directions in accordance with the posture of the vehicle in the pitch direction based on the above-mentioned vehicle height signal from the vehicle height sensor 140. It is also possible that the headlight 300 has an Adaptive Front lighting System (AFS) whereby, in a curved road, based on the above-mentioned steering angle signal from the steering angle sensor 120, the optical axis is deflected in the steering direction in the leftward/rightward directions in accordance with the vehicle's steering direction. In other words, it is possible that the headlight 300 has a tilt function deflecting the optical axis in the upward/downward directions and a swivel function of deflecting the optical axis in the leftward/rightward directions. Hereinafter, the headlight 300 will be referred to as the headlight 300 as a unit except where it is necessary to distinguish it between the headlights 300L and 300R.

Note that it is possible that the above-described automatic leveling function (the tilt function) and the AFS function (the swivel function) are implemented through the control carried-out by the ECU 200. Also, it is possible that the optical axes of the respective headlights 300L and 300R are controlled in the upward/downward directions and the leftward/rightward directions separately.

The headlight 300 is the lighting device capable of drawing an image on a desired projection plane in front of the vehicle, and capable of making the light quantities or so in the respective irradiation directions different thereamong in the irradiation range. It is possible to apply a spatial light modulator of a reflection type using a Micro Electro Mechanical System (MEMS) mirror device having a plurality of very small mirror elements arranged therein to the headlight 300, for example. The headlight 300 includes irradiation parts 310 and driving parts 320.

The irradiation parts 310 (the irradiation parts 310L and 310R corresponding to the respective headlights 300L and 300R) are driven by the driving parts 320 (320R and 320L), and irradiate the front of the vehicle according to a luminous intensity distribution (shape) determined by the ECU 200. The irradiation parts 310 include lamps as light sources, a MEMS mirror device having many very small mirror elements controlling the reflection directions of light from the lamps arranged therein and projection lenses forming images of light coming from the MIMS device. The respective very small mirror elements in the MEMS mirror device can be mechanically changed in their inclination angles separately according to the corresponding electrical inputs. In accordance with the inclination angles of the respective very small mirrors that can be selectively changed, light incident on each of the very small mirrors is selectively modulated (blocked, reduced and/or the like), and the thus modulated light is irradiated in front of the vehicle.

The driving parts 320 (the driving parts 320L and 320R corresponding to the respective headlights 300L and 300R) are driving devices for driving the irradiation parts 310 (310L and 310R) in such a manner as to irradiate the front of the vehicle according to a predetermined luminous intensity distribution (shape) based on the control signal (the irradiation image) transmitted by the ECU 200 (the luminous intensity distribution control part 240). Specifically, the driving parts 320 drive the respective very small mirror elements included in the MEMS mirror device in such a manner that the irradiation image corresponding to the predetermined luminous intensity distribution (shape) is projected in front of the vehicle.

Note that the specific configuration of the headlight 300 can be any configuration as long as it is capable of irradiating the front of the vehicle while making the light quantities or so in the respective irradiation directions different thereamong according to a luminous intensity distribution (shape) described later.

For example, the headlight 300 can have a configuration as a lighting device of a liquid crystal projector type. That is, the irradiation parts 310 can include liquid crystal panels (transmission-type spatial light modulators) where lamps as light sources and many liquid crystal devices controlling transmission of the light coming from the lamps are arranged, and projection lenses that form images of the light transmitted through the liquid crystal panels. The driving parts 320 control (change) voltages applied to the respective liquid crystal devices in the liquid crystal panels and thus, are capable of changing the reflection/transmission states of the light that is incident from the light sources. Thereby, it is possible to irradiate the light from the light sources after reducing the light quantity, or block the light. Specifically, it is possible that the ECU 200 (the luminous intensity distribution control part 240) transmits, as a control instruction, an image (the irradiation image) to be projected in front of the vehicle to the driving parts 320, and the driving parts 320 change the voltages applied to the respective liquid crystal devices in the irradiation parts 310 in such a manner that the irradiation image is projected in front of the vehicle.

The headlight 300 can have a configuration of a lighting device of a LED matrix type. That is, the irradiation parts 310 can include LED arrays where many LED chips are arranged and many projection lenses forming images of light coming from the LED arrays. The driving parts 320 change electric current amounts or electric current supply periods for the respective LED chips and thereby, are capable of changing the light quantities of the respective LED chips. Specifically, it is possible that the ECU 200 (the luminous intensity distribution control part 240) transmits, as a control instruction, an image (the irradiation image) to be projected in front of the vehicle to the driving parts 320, and the driving parts 320 change the electric current amounts or the electric current supply periods of time for the respective LED chips in the irradiation parts 310 in such a manner that the irradiation image is projected in front of the vehicle.

Next, the luminous intensity distribution control carried out by the ECU 200 (the luminous intensity distribution control part 240) in a bad weather condition (a rainfall, a snowfall, fog generation or so) causing a low visibility in front of the vehicle will be described.

Figure 2A:
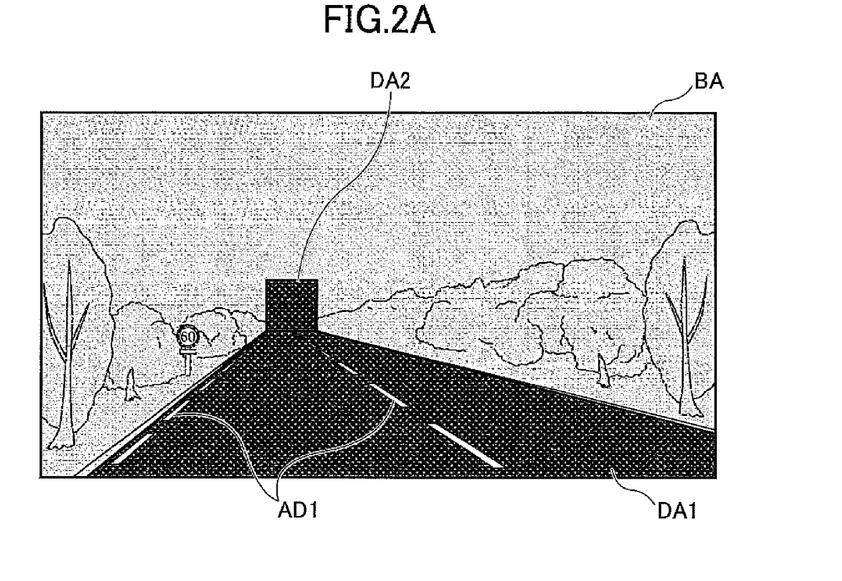
FIGS. 2A and 2B are schematic diagrams illustrating examples of states in front of a vehicle irradiated by the vehicular lighting apparatus according to the first embodiment in a bad weather condition (fog generation)
Figure 2B:
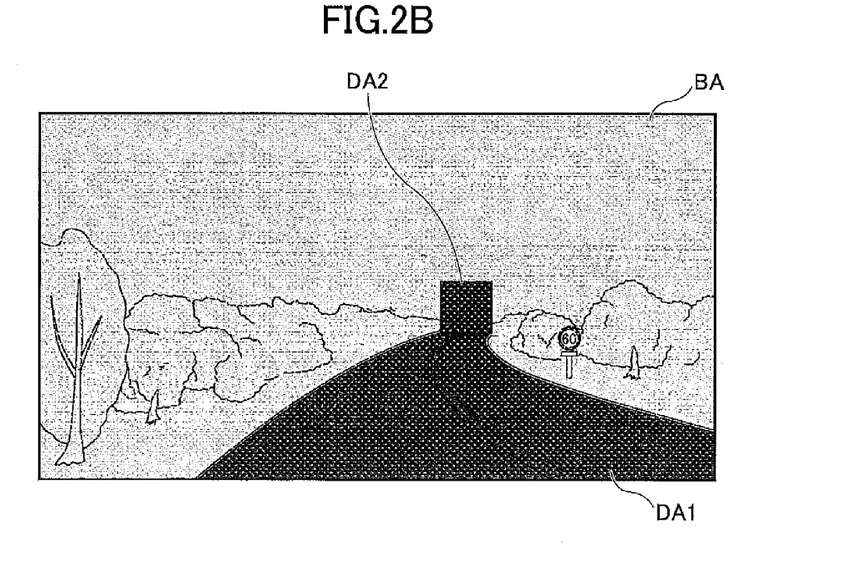

FIGS. 2A and 2B are schematic diagrams illustrating examples of states in front of the vehicle irradiated by the vehicular lighting apparatus 1 (the headlight 300) according to the first embodiment in a bad weather condition (at a time of fog generation). FIG. 2A is a schematic diagram illustrating one example of a state in front of the vehicle irradiated by the vehicular lighting apparatus 1 (the headlight 300) in a bad weather condition (fog generation) when the vehicle is travelling on a straight road. FIG. 2B is a schematic diagram illustrating one example of a state in front of the vehicle irradiated by the vehicular lighting apparatus 1 (the headlight 300) in a bad weather condition (fog generation) when the vehicle is travelling on a curved road.

During fog generation, when the vehicular lighting apparatus 1 irradiates the irradiation range in front of the vehicle uniformly with normal irradiation light, the driver's view may have a whiteout state due to a veiling phenomenon occurring from the irradiation light being irregularly reflected by the fog particles. As a result, it may be difficult for the driver to see the travelling route in front of the vehicle.

In contrast thereto, according to the first embodiment, the vehicular lighting apparatus 1 (the headlight 300) irradiates a road surface zone in the travelling route (actually, the road surface zone corresponding to the road shape of the travelling route estimated by the vehicle travelling route estimation part 230) in the irradiation range in front of the vehicle in a manner of reducing the light quantity according to the luminous intensity distribution control of the luminous intensity distribution control part 240. Thereby, as shown in FIGS. 2A and 2B, due to the contrast between the road surface zone DA1 in the travelling route in front of the vehicle irradiated with the reduced light quantity thus seeming dark and the normal irradiation zone BA irradiated with normal irradiation light and thus seeming approximately solid white, it is possible to improve the visibility of the travelling route in front of the vehicle.

Also, according to the first embodiment, the vehicular lighting apparatus 1 (the headlight 300) irradiates an angle direction in the irradiation range above the road surface zone DA1 in a manner of reducing the light quantity in a predetermined angle range according to the luminous intensity distribution control of the luminous intensity distribution control part 240. Thereby, the road surface upper zone DA2 in the extending direction of the road surface zone DA1 seems dark in the same way as the road surface zone DA1. Thus, due to the contrast between the road surface upper zone DA2 and the normal irradiation zone BA that seems approximately solid white, the road surface upper zone DA2 can be used as a guide for the direction in which the vehicle travels, and thus, it is possible to further improve the visibility of the travelling route in front of the vehicle.

Also, in the example of FIG. 2A, the vehicular lighting apparatus 1 (the headlight 300) displays aid lines AD1 along the travelling route in front of the vehicle in the road surface zone DA1 according to the luminous intensity distribution control of the luminous intensity distribution control part 240. That is, it is possible to display the aid lines AD1 in the road surface zone DA1 by irradiating without reducing the light quantity in the parts corresponding to the aid lines AD1 in the road surface zone DA1 irradiated with the reduced light quantity, or irradiating the parts corresponding to the aid lines AD1 with the light quantity not so reduced as the road surface zone DA1. As a result, the aid lines AD1 can be used as guides for the direction in which the vehicle travels, and thus, it is possible to further improve the visibility of the travelling route in front of the vehicle.

Figure 3:
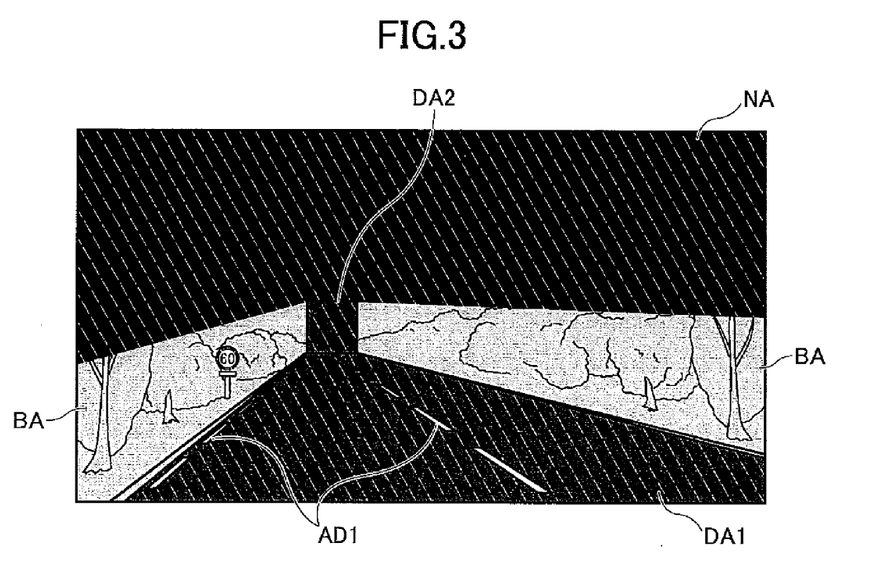
FIG. 3 is a schematic diagram illustrating one example of a state in front of a vehicle irradiated by the vehicular lighting apparatus according to the first embodiment in a bad weather condition (a rainfall or a snowfall)

FIG. 3 is a schematic diagram illustrating another example of a state in front of the vehicle irradiated by the vehicular lighting apparatus 1 according to the first embodiment in a bad weather condition (a rainfall or a snowfall).

During rainfall or snowfall, if the vehicular lighting apparatus 1 irradiates the irradiation range in front of the vehicle uniformly with normal irradiation light, the entirety of the front of the vehicle may seem uniformly bright (whitish) as a result of the irradiation light being totally reflected by the wet part or snow part in front of the vehicle. As a result, it may be difficult for the driver to see the travelling route in front of the vehicle.

In contrast thereto, according to the first embodiment, in the same way as the examples of FIGS. 2A and 2B, the vehicular lighting apparatus 1 (the headlight 300) irradiates a road surface zone of the travelling route in the irradiation range in front of the vehicle (actually, the road surface zone corresponding to the road shape of the travelling route estimated by the vehicle travelling route estimation part 230) with a reduced light quantity according to the luminous intensity distribution control of the luminous intensity distribution control part 240. Thereby, as shown in FIG. 3, due to the contrast between the road surface zone DA1 of the travelling route in front of the vehicle irradiated with the reduced light quantity and thus seeming dark and the normal irradiation zone BA irradiated with the normal irradiation light and thus seeming whitish (very bright), it is possible to improve the visibility of the travelling route in front of the vehicle.

Also, according to the first embodiment, in the same way as the examples of FIGS. 2A and 2B, the vehicular lighting apparatus 1 (the headlight 300) irradiates an angle direction in the irradiation range above the road surface zone DA1 with a reduced light quantity in a predetermined angle range according to the luminous intensity distribution control of the luminous intensity distribution control part 240. Thereby, in the same way as the examples of FIGS. 2A and 23, due to the contrast between the road surface upper zone DA2 seeming dark in the same way as the road surface zone DA1 in the direction in which the road surface zone DA1 extends and the normal irradiation zone BA seeming whitish (very bright), the road surface upper zone DA2 can be used as a guide for the direction in which the vehicle travels, and thus, it is possible to further improve the visibility of the travelling route in front of the vehicle.

Further, according to the first embodiment, in the same way as the example of FIG. 2A, the vehicular lighting apparatus 1 (the headlight 300) displays aid lines AD1 along the travelling route in front of the vehicle in the road surface zone DA1 according to the luminous intensity distribution control of the luminous intensity distribution control part 240. It is possible to display the aid lines AD1 in the road surface zone DA1 by irradiating without reducing the light quantity in the parts corresponding to the aid lines AD1 in the road surface zone DA1 irradiated with the reduced light quantity, or irradiating the parts corresponding to the aid lines AD1 with the light quantity not so reduced as the road surface zone DA1. Because the aid lines AD1 can be used as guides for the direction in which the vehicle travels, it is possible to further improve the visibility of the travelling route in front of the vehicle.

Also, according to the first embodiment, the vehicular lighting apparatus 1 (the headlight 300) irradiates the front of the vehicle in the irradiation range of the headlight 300 while reducing the upper angle range according to the luminous intensity distribution control of the luminous intensity distribution control part 240. That is, in the normal irradiation range of the headlight 300, the vehicular lighting apparatus 1 does not irradiate a direction for a higher place where objects other than rain or snow that reflects the irradiation light are not likely to occur. Thus, it is possible to prevent raindrops during rainfall or snow during snowfall, the positions of which in the space are not uniform, from adversely affecting the driver's visibility (how the driver can see the front of the vehicle) by totally reflecting the irradiation light irregularly, and it is possible to further improve the visibility of the travelling route in front of the vehicle.

Figure 4:
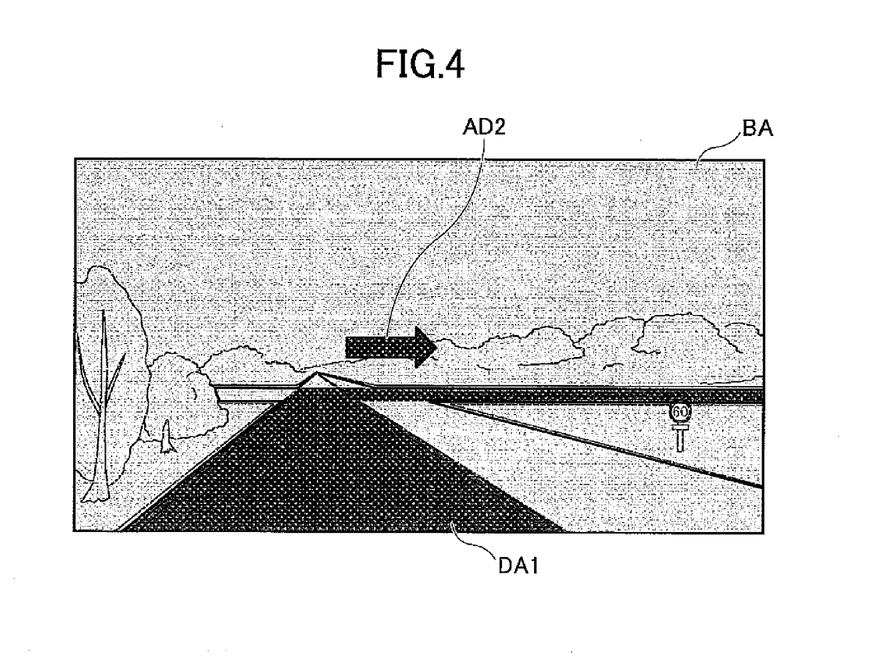
FIG. 4 is a schematic diagram illustrating another example of a state in front of a vehicle irradiated by the vehicular lighting apparatus according to the first embodiment in a bad weather condition (fog generation)

FIG. 4 is a schematic diagram illustrating yet another example of a state of the front of the vehicle irradiated by the vehicular lighting apparatus 1 according to the first embodiment in a bad weather condition (fog generation). Specifically, FIG. 4 is a schematic diagram illustrating an example of a state of the front of the vehicle irradiated by the vehicular lighting apparatus 1 (the headlight 300) when the vehicle is approaching a branch road (an intersection).

In this example, the vehicle travelling route estimation part 230 estimates a road shape of a travelling route that turns right at the intersection from among a plurality of alternatives of the travelling routes as the branches from the intersection based on the guidance route information transmitted by the navigation control part 173. Then, the vehicular lighting apparatus 1 irradiates with a reduced light quantity the road surface zone DA1 corresponding to the road shape of the travelling route that turns right at the intersection estimated by the vehicle travelling route estimation part 230, according to the luminous intensity distribution control of the luminous intensity distribution control part 240. Thereby, in the same way as the examples of FIGS. 2A and 2B, due to the contrast between the road surface zone DA1 of the travelling route in front of the vehicle irradiated with the reduced light quantity and thus seeming dark and the normal irradiation zone BA irradiated with the normal irradiation light and thus seeming approximately solid white, it is possible to improve the visibility of the travelling route in front of the vehicle. Further, as a result of thus estimating (determining) the road shape of the travelling route to be irradiated with a reduced light quantity in cooperation with the guidance route of the navigation unit 170, it is possible to further improve the visibility of the travelling route in front of the vehicle.

Also, in this example, the vehicular lighting apparatus 1 displays a guidance indication AD2 in the fog in front of the vehicle indicating to turn right at the intersection according to the luminous intensity distribution control of the luminous intensity distribution control part 240. That is, the vehicular lighting apparatus 1 displays, as the guidance indication AD2, an arrow pointing the right direction in the fog irradiated with a reduced light quantity, by irradiating the predetermined irradiation direction range with the reduced light quantity in the normal irradiation zone BA in the irradiation range. By thus displaying the guidance indication in the fog in cooperation with the guidance route of the navigation unit 170, it is possible to further improve the visibility of the travelling route in front of the vehicle.

Next, a specific process carried out by the vehicular lighting apparatus 1 (the ECU 200) for implementing the luminous intensity distribution control in a bad weather condition by the luminous intensity distribution control part 240 will be described.

Figure 5:
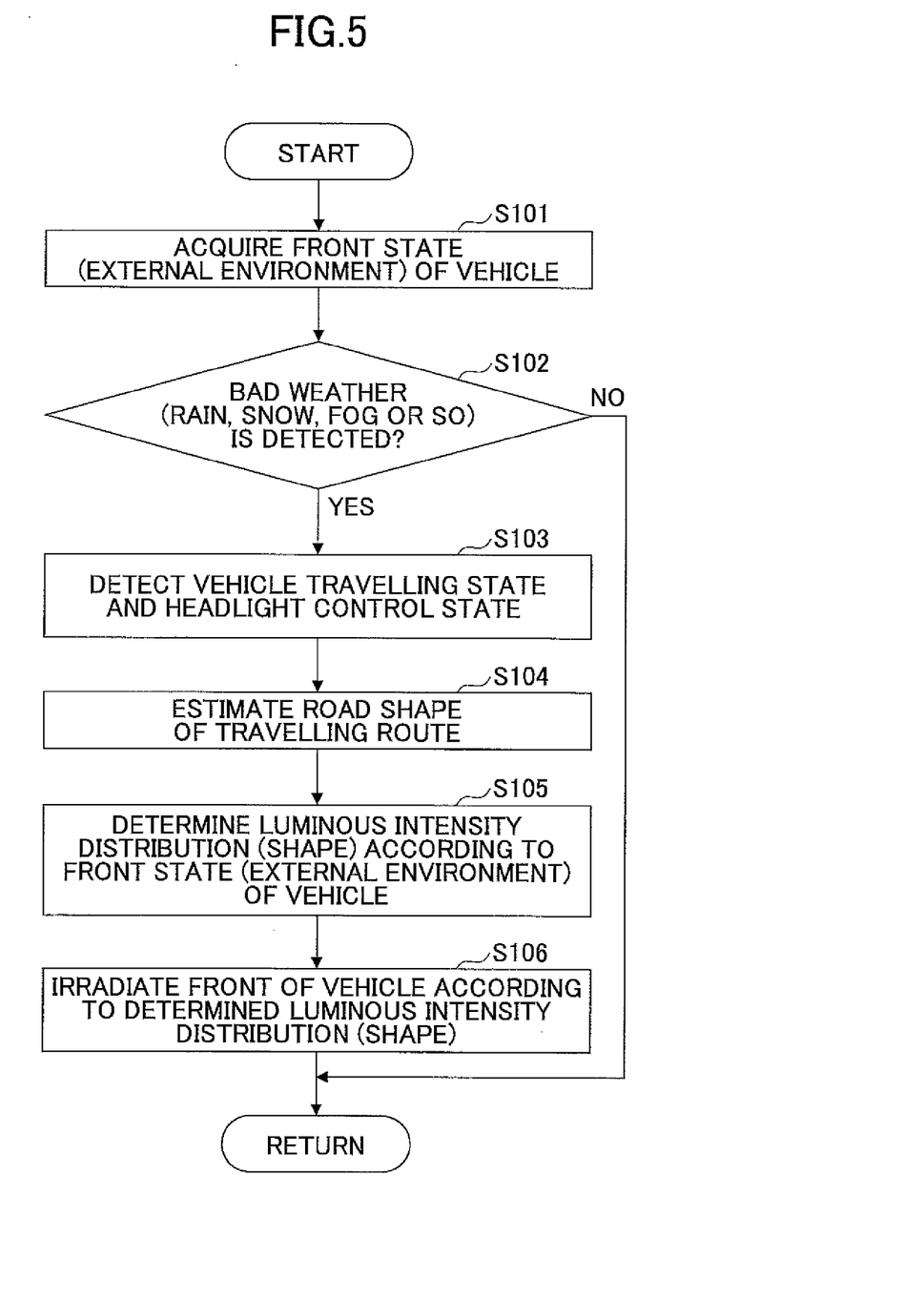
FIG. 5 is a flowchart illustrating one example of a control process in the vehicular lighting apparatus according to the first embodiment.

FIG. 5 is a flowchart illustrating one example of a control process in the vehicular lighting apparatus 1 (the ECU 200) according to the first embodiment. Specifically, FIG. 5 is a flowchart illustrating one example of a control process corresponding to the above-described luminous intensity distribution control by the luminous intensity distribution control part 240 in a bad weather condition. The flowchart is executed every predetermined period of time T during a period of time starting from turning on the ignition in the vehicle (IG-ON) and ending at turning off the ignition in the vehicle (IG-OFF).

First, Steps S101-S104 are executed as preprocessing for carrying out the luminous intensity distribution control by the luminous intensity distribution control part 240 in a bad weather condition.

In Step S101, the bad weather detection part 210 acquires a front state (an external environment) of the vehicle. Specifically, the bad weather detection part 210 receives the bad weather information from the camera 110 (the image processing part 111), the rain signal (the signal corresponding to the detected rainfall) from the rain sensor 150, the illumination signal (the signal corresponding to the detected illumination) from the illumination sensor 160, the weather forecast information from the navigation control part 173, and so forth.

In Step S102, the bad weather detection part 210 determines whether it detects a bad weather condition (a rainfall, a snowfall, fog generation or so) at the position of the vehicle based on the bad weather information, the rain signal, the illumination signal, the weather forecast information, and/or the like. When the bad weather detection part 210 determines that it detects a bad weather condition, it proceeds to Step S103. When the bad weather detection part 210 does not determine that it detects a bad weather condition, it finishes the current process.

In Step S103, the vehicle's travelling state and the control state of the headlight 300 are detected. More specifically, the vehicle travelling state detection part 220 detects the vehicle's travelling state (the vehicle speed, the steering angle, the posture of the vehicle in the pitch direction, and so forth) based on the steering angle signal from the steering angle sensor 120, the vehicle speed signal from the vehicle speed sensor 130 and the vehicle height signal from the vehicle height sensor 140. Also, the luminous intensity distribution control part 240 detects the state of controlling the headlight 300 by the ECU 200 (for example, whether the optical axes are controlled and thus deflected by the above-described AFS function, the specific deflection amounts if the optical axes are thus deflected, and/or the like).

In Step S104, the vehicle travelling route estimation part 230 estimates the road shape (the road width, the curvature of a curved road, the road shape of a branch road such as an intersection, or so) of the travelling route in front of the vehicle. Specifically, the vehicle travelling route estimation part 230 estimates the road shape in front of the vehicle at the current position based on the information transmitted by the camera 110 (the image processing part 111), the navigation unit 170 (the navigation control part 173) and so forth. Also, the vehicle travelling route estimation part 230 estimates the road shape in front of the vehicle at the future position (the vehicle's position after the predetermined period of time T) based on the information transmitted by the camera 110 (the image processing part 111), the navigation unit 170 (the navigation control part 173), the vehicle travelling state detection part 220, and so forth.

Steps S105-S106 are a process of specifically carrying out the luminous intensity distribution control by the luminous intensity distribution control part 240 in the bad weather condition.

In Step S105, the luminous intensity distribution control part 240 determines the luminous intensity distribution (shape) according to the front state (external environment) of the vehicle. For example, it is possible that, when fog generation is detected by the bad weather detection part 210, the luminous intensity distribution control part 240 determines such a luminous intensity distribution (shape) of the headlight 300 (the headlights 300L and 300R) as to irradiate the front of the vehicle in such a manner as shown in FIG. 2A or 2B, FIG. 4, or so. Also, it is possible that, when a rainfall or a snowfall is detected by the bad weather detection part 210, the luminous intensity distribution control part 240 determines such a luminous intensity distribution (shape) of the headlight 300 (the headlights 300L and 300R) as to irradiate the front of the vehicle in such a manner as shown in FIG. 3 or so.

Step S105 will now be described in more detail.

The luminous intensity distribution control part 240 acquires the irradiation range, the irradiation directions (the optical axes) and so forth of the irradiation light irradiated by the headlight 300 in front of the vehicle based on the posture of the vehicle in the pitch direction detected by the vehicle travelling state detection part 220, the control state of the headlight 300, and so forth.

For example, when the optical axes of the headlight 300 are deflected in the left/right directions due to the AFS function described above, the irradiation range of the irradiation light from the headlight 300 is deflected in the right/left directions. Also, due to a change in the posture of the vehicle in the pitch direction, the optical axes are deflected in the upward/downward directions. Therefore, the luminous intensity distribution control part 240 carries out the luminous intensity distribution control after acquiring the irradiation range, the irradiation directions (the optical axes) and so forth that change due to the vehicle's posture and the control state of the headlight 300.

Next, the luminous intensity distribution control part 240 determines the luminous intensity distribution (shape) based on the road shape in front of the vehicle at the current position and the road shape in front of the vehicle at the future position estimated by the vehicle travelling route estimation part 230. This is because, as a result of the flowchart being executed every predetermined period of time T, it is necessary to consider that the vehicle moves every predetermined period of time T. For example, it is possible that the luminous intensity distribution control part 240 determines a plurality of luminous intensity distributions (shapes) corresponding to the respective road shapes in such a manner as to gradually change the luminous intensity distribution (shape) from the road shape in front of the vehicle in the current position to the road shape in front of the vehicle in the future position. Further, it is also possible to determine such a luminous intensity distribution (shape) as to cover the road shape in front of the vehicle in the current position and the road shape in front of the vehicle in the future position.

In Step S106, the luminous intensity distribution control part 240 causes the headlight 300 to irradiate the front of the vehicle according to the thus determined luminous intensity distribution (shape), and finishes the current process. Specifically, the luminous intensity distribution control part 240 transmits the irradiation image corresponding to the determined luminous intensity distribution (shape) to the driving parts 320 (320L, 320R) of the headlight 300, and the driving parts 320 (320L, 320R) drive the irradiation parts 310 (310L, 310R) according to the irradiation image. Thereby, the irradiation parts 310 (310L, 310R) irradiate the front of the vehicle according to the luminous intensity distribution (shape) determined by the luminous intensity distribution control part 240.

Thus, the vehicular lighting apparatus 1 irradiates the front of the vehicle according to the luminous intensity distribution (a shape) as illustrated in any one of FIGS. 2A-4 in a bad weather condition causing a low visibility in front of the vehicle. Thus, it is possible to improve the visibility of the travelling route in front of the vehicle.

Thus, the vehicular lighting apparatus has been described in the embodiment. However, the present invention is not limited to such a specific embodiment, and various modifications can be made without departing from the scope of the present invention.

For example, in the above-described embodiment, a rainfall, a snowfall and fog generation have been described as examples of a bad weather condition causing a low visibility in front of the vehicle. However, it is also possible that the vehicular lighting apparatus 1 carries out operations the same as or similar to those described above in the embodiment in another bad weather condition. Specifically, the bad weather conditions causing a low visibility in front of the vehicle can include a condition caused by an emission in the air such as smog that is artificially emitted. When smog or so is generated, it is possible that the vehicular lighting apparatus 1 carries out operations the same as or similar to those described above in the embodiment. That is, when smog is generated, it is possible that the vehicular lighting apparatus 1 irradiates the front of the vehicle according to the luminous intensity distribution (shape) illustrated in FIG. 2A or 2B. Thereby, in the same way as the above-described embodiment, it is possible to improve the visibility of the travelling route in front of the vehicle when smog is generated. Note that it is possible that, whether smog is generated is detected based on, for example, smog information (information concerning photochemical smog, PM2.5, and/or the like) included in the weather forecast information delivered by the information center 1000 to the navigation unit 170 in the above-described embodiment.

Thus, according to the embodiment, it is possible to provide a vehicular lighting apparatus by which it is possible to improve the visibility of the travelling route in front of a vehicle even in a bad weather condition such as a rainfall, a snowfall, fog generation or so causing a low visibility in front of the vehicle.

The present application is based on and claims the benefit of priority of Japanese Priority Application No. 2014-141453, filed on Jul. 9, 2014, the entire contents of which are hereby incorporated herein by reference.

What is claimed is:

1. A vehicular lighting apparatus comprising:
a headlight that irradiates the front of a vehicle;
a condition detection part that detects a weather condition at a position of the vehicle;
a travelling route estimation part that estimates a road shape of a travelling route in front of the vehicle; and
a control part that controls a luminous intensity distribution of the headlight, wherein
when the condition detection part does not detect a weather condition as to cause a low visibility in front of the vehicle, the control part controls the headlight in such a manner as to irradiate a road surface zone at a normal quantity of light,
when the condition detection part does detect the weather condition as to cause the low visibility in front of the vehicle, the control part controls the headlight in such a manner as to irradiate the road surface zone in front of the vehicle with a reduced quantity of light that is lower than the normal quantity of light, and
the road surface zone in front of the vehicle corresponding to the road shape of the travelling route estimated by the travelling route estimation part.

2. The vehicular lighting apparatus as claimed in claim 1, wherein
the control part controls the headlight in such a manner as to irradiate a predetermined angle range in an angle direction above the road surface zone in front of the vehicle with the reduced quantity of light when the condition detection part detects the weather condition as to cause the low visibility in front of the vehicle.

3. The vehicular lighting apparatus as claimed in claim 2, wherein the predetermined angle range in the angle direction above the road surface zone to be irradiated with the reduced quantity of light when the condition detection part detects the weather condition as to cause the low visibility in front of the vehicle corresponds to a zone in an extending direction of the road surface zone in front of the vehicle.

4. The vehicular lighting apparatus as claimed in claim 1, wherein
the control part controls the headlight in such a manner as to irradiate the front of the vehicle while reducing an upper angle part of an irradiation range of the headlight when the condition detection part detects a rainfall or a snowfall.

5. The vehicular lighting apparatus as claimed in claim 2, wherein
the control part controls the headlight in such a manner as to irradiate the front of the vehicle while reducing an upper angle part of an irradiation range of the headlight when the condition detection part detects a rainfall or a snowfall.

6. The vehicular lighting apparatus as claimed in claim 3, wherein
the control part controls the headlight in such a manner as to irradiate the front of the vehicle while reducing an upper angle part of an irradiation range of the headlight when the condition detection part detects a rainfall or a snowfall.

7. The vehicular lighting apparatus as claimed in claim 1, wherein
the control part controls the headlight in such a manner as to display a guidance indication in a fog in front of the vehicle when the condition detection part detects the fog, the guidance indication corresponding to the road shape of the travelling route estimated by the travelling route estimation part.

8. The vehicular lighting apparatus as claimed in claim 2, wherein
the control part controls the headlight in such a manner as to display a guidance indication in a fog in front of the vehicle when the condition detection part detects the fog, the guidance indication corresponding to the road shape of the travelling route estimated by the travelling route estimation part.

9. The vehicular lighting apparatus as claimed in claim 3, wherein
the control part controls the headlight in such a manner as to display a guidance indication in a fog in front of the vehicle when the condition detection part detects the fog, the guidance indication corresponding to the road shape of the travelling route estimated by the travelling route estimation part.

10. The vehicular lighting apparatus as claimed in claim 1, further comprising:
a vehicle travelling state detection part that detects a vehicle traveling state and a control state of the headlight,
wherein the control part controls the luminous intensity distribution of the headlight based on the vehicle traveling state and the control state of the headlight when the condition detection part does detect the weather condition as to cause the low visibility in front of the vehicle.

* * * * *